(12) United States Patent
Yoshima

(10) Patent No.: US 8,909,372 B2
(45) Date of Patent: Dec. 9, 2014

(54) ROBOT SYSTEM CONTROL METHOD

(75) Inventor: Kazumasa Yoshima, Osaka (JP)

(73) Assignee: Panasonic Corporation, Osaka (JP)

( * ) Notice: Subject to any disclaimer, the term of this patent is extended or adjusted under 35 U.S.C. 154(b) by 65 days.

(21) Appl. No.: 13/382,398

(22) PCT Filed: Jan. 31, 2011

(86) PCT No.: PCT/JP2011/000503
§ 371 (c)(1),
(2), (4) Date: Jan. 5, 2012

(87) PCT Pub. No.: WO2011/096185
PCT Pub. Date: Aug. 11, 2011

(65) Prior Publication Data
US 2012/0116585 A1 May 10, 2012

(30) Foreign Application Priority Data
Feb. 3, 2010 (JP) ................................. 2010-021779

(51) Int. Cl.
*G05B 19/418* (2006.01)
*B23K 9/10* (2006.01)
*B23K 9/173* (2006.01)
*B25J 9/16* (2006.01)

(52) U.S. Cl.
CPC ..... *B25J 9/1682* (2013.01); *G05B 2219/39122* (2013.01); *G05B 2219/39141* (2013.01); *B23K 9/1062* (2013.01); *B23K 9/1735* (2013.01); *B25J 9/1669* (2013.01); *Y10S 901/02* (2013.01)
USPC ............................................. 700/248; 901/2

(58) Field of Classification Search
None
See application file for complete search history.

(56) References Cited

U.S. PATENT DOCUMENTS

| 2002/0029095 A1 | 3/2002 | Kosaka et al. | |
| 2005/0055132 A1* | 3/2005 | Matsumoto et al. | 700/245 |
| 2006/0069466 A1* | 3/2006 | Kato et al. | 700/264 |

(Continued)

FOREIGN PATENT DOCUMENTS

| EP | 1 186 386 A2 | 3/2002 |
| EP | 1 468 791 A1 | 10/2004 |

(Continued)

OTHER PUBLICATIONS

Supplementary European Search Report for EP 11 73 9535, Mar. 13, 2013.

(Continued)

*Primary Examiner* — Khoi Tran
*Assistant Examiner* — Ryan Rink
(74) *Attorney, Agent, or Firm* — RatnerPrestia

(57) ABSTRACT

In a control method of a robot system of the present invention, one of two industrial robots is used as a master robot, and the other is used as a slave robot. Data indicating the relation of the relative position and relative attitude between the master robot and the slave robot in welding conditioning work is stored as one set of information. During teaching work, in a state where the master robot and the slave robot exist at any positions, the slave robot is moved with respect to the position of the master robot so as to reproduce the relation of the relative position and relative attitude indicated by the one set of stored information, or the master robot is moved with respect to the position of the slave robot.

5 Claims, 11 Drawing Sheets

(56) References Cited

U.S. PATENT DOCUMENTS

| | | | | |
|---|---|---|---|---|
| 2006/0137164 | A1* | 6/2006 | Kraus | 29/407.1 |
| 2008/0083705 | A1* | 4/2008 | Peters | 219/61 |
| 2008/0314887 | A1* | 12/2008 | Stoger et al. | 219/137 R |
| 2011/0163073 | A1* | 7/2011 | Schulze | 219/75 |

FOREIGN PATENT DOCUMENTS

| | | |
|---|---|---|
| EP | 1 642 690 A2 | 4/2006 |
| EP | 2 008 779 A1 | 12/2008 |
| JP | 02-271402 A | 11/1990 |
| JP | 09-010939 A | 1/1997 |
| JP | 10-063322 A | 3/1998 |
| JP | 11-031009 A | 2/1999 |
| JP | 11-342473 A | 12/1999 |
| JP | 2001-353579 A | 12/2001 |
| JP | 2005-219147 A | 8/2005 |
| JP | 2005-254242 A | 9/2005 |
| JP | 2005-262369 A | 9/2005 |
| JP | 2005-324250 A | 11/2005 |
| JP | 2006-099474 A | 4/2006 |
| JP | 2007-199936 A | 8/2007 |
| JP | 2008-310557 A | 12/2008 |
| WO | WO 2005/091090 A2 | 9/2005 |

OTHER PUBLICATIONS

International Search Report for PCT/JP2011/000503, May 17, 2011.
Chinese Search Report for Application No. 201180003383.2, dated Nov. 20, 2013.

* cited by examiner

```
         . . .
         MOVEL    P210       ···L201
         PRE-SET WLD#10      ···L202
         MOVEL    P211       ···L203
PRG2     ARC-ON Lead         ···L204
         ARC-ON Trail        ···L205
         MOVEL    P212       ···L206
         ARC-OFF Lead        ···L207
         ARC-OFF Trail       ···L208
         MOVEL    P213       ···L209
         . . .
```

ROBOT SYSTEM CONTROL METHOD

TECHNICAL FIELD

The present invention relates to a control method of a robot system when two industrial robots (two sets) that work according to a predetermined program are used and are applied to one object.

BACKGROUND ART

Conventionally, in a production site where a welding process is performed, for example, an industrial robot including a welding robot for performing welding work is introduced, and automation and manpower-saving are promoted. Here, "industrial robot" is a generic name for a configuration where a manipulator, a controller, a tool for work, and the other peripheral devices are interconnected. "Welding robot" is a generic name for a configuration where apparatuses and components such as a manipulator, a controller, a welding machine, a welding torch, and a welding electrode, and the other peripheral devices are interconnected. Recently, for improving the efficiency of the welding work, for example, for reducing the time for the welding work, a plurality of industrial robots are used for one object (hereinafter referred to as "work piece" in response to the generic name), and a plurality of industrial robots are apt to be operated simultaneously and collectively.

In such a case, the following coordinative control between robots is often used: a handling robot that grips a work piece firstly changes the attitude of the work piece to a coupling attitude that allows appropriate welding, and a welding robot operates a welding torch to perform welding in coordination with the handling robot. In such an example, it is important to control the relationship in the relative position and relative attitude (hereinafter referred to as "relationship") between a tool for work (for example, a gripping mechanism for gripping a work piece) of the handling robot that grips the work piece and a tool for work (the tip of a welding electrode in the welding torch) of the welding robot. For example, when the robot that grips the work piece is operated manually, the control is performed so that a robot that grips the welding torch is operated while the relationship is kept. Such control is the so-called "associative movement control", and is widespread (for example, Patent Literature 1).

Alternatively, an example is known where, one of two robots carries a tungsten inert gas (TIG) electrode, the other robot carries a filler wire, and the electrode is made close to the filler wire and is TIG-welded to it by coordination operation (for example, Patent Literature 2). In this case, the positional relationship between the TIG electrode, filler wire, and a weld line under welding is important. Therefore, Patent Literature 2 discloses the example where the operation trajectory is shifted in response to a signal from the outside while the relative position is kept, and further the relative position is finely adjusted. Such control is also a type of "associative movement control".

In a considered method of performing the efficiency improvement such as time reduction of the welding process, two welding robots each of which has one electrode are used, and two-electrode welding is performed for one weld line.

A general welding condition for welding includes many parameters such as "welding current", "welding voltage", "welding speed", "weaving method", and "aiming position for welded joint". Here, "aiming position for welded joint" indicates the position of the tip of the welding electrode for a welded joint and the angle of the welding electrode with respect to the welded joint.

In the welding by two welding robots, the welding result depends on the relationship between two welding robots. The relationship between two welding robots is specifically the relative position between the tips of two welding electrodes of the two welding robots and the relative attitude between the tips of two welding electrodes. In this case, in addition to "aiming position for welded joint", "relationship" is also one of parameters constituting the welding condition. In order to perform welding for forming a desired bead with stable arcs without making two arcs generated by two welding electrodes interfere with each other, an appropriate relationship is required.

As the welding condition including many parameters, an appropriate combination is often determined by performing welding many times by try and error while each parameter is changed. The operation is referred to as "welding conditioning work". For performing "welding conditioning work", generally, an actual work piece to be welded is not used but a test piece formed by reproducing only the welded joint is used. In the welding by two welding robots, "relationship" is also determined through "welding conditioning work".

The welding work for an actual work piece to be welded is performed by execution of the predetermined program by the welding robots. The welding work by the welding robots includes many sequential operations, and is performed by controlling an apparatus such as a welding machine as necessary in response to the operations. Therefore, a sequence of commands and data that indicate respective operations required for the welding work and a command and parameter that are required for controlling an apparatus such as the welding machine are registered in the program.

When the program is created, these commands, data, and parameters are stored in a storage medium such as a memory of the controller of the welding robot. The command and data indicating each operation include data indicating the coordinate and attitude for each operation. The welding robot is actually moved to the coordinate and attitude, and the program is created so as to teach the welding robot the work. This operation is referred to as "teach". Generally, this program creating work is referred to as "teaching work". The means of the coordinate and attitude of the welding robot is described later.

In the teaching work for the welded joint of the welding part of the work piece, the welding condition obtained by the welding conditioning work is reflected to the program. As numerical parameters such as welding current and welding voltage, of the welding condition, the values obtained by the welding conditioning work are set in the program. Thus, the welding obtained by the welding conditioning work can be relatively easily reproduced. While, regarding "relationship" during welding, the relationship between two robots in the target welding part of the work piece is reproduced and taught by actually operating two welding robots for each operation during the actual welding.

In a considered method for teaching the relationship, "aiming position for welded joint" of one robot is firstly reproduced, and then "relationship" is reproduced by operating the other. Another method may be used where "relationship" is reproduced near the welded joint and then "aiming position for welded joint" is reproduced by operating both robots while the relationship is kept (here, "associative movement control" is used). Among them, as a considered method for reproducing the relationship, the coordinate and attitude in the coordinate system of each welding robot during the welding conditioning work are noted, and the coordinate and attitude are reproduced referring to the note during teaching of the target welding part of the actual work piece. Generally, at that time, the position in the coordinate system of the welding robot is completely different from that in the welding conditioning work, and the direction of the weld line is not always the same. Therefore, the noted values of the coordinate and attitude are converted into the present coordinate and attitude, and the relationship is reproduced with the welding robot. This operation is actually extremely troublesome. The controller of a usual welding robot has a function of displaying the coordinate and attitude of the control point, so that the coordinate and attitude in the coordinate system of each welding robot can be obtained using the function. Generally, the control point is disposed at the tip of the welding electrode.

Once the relationship is established, "associative movement control" where one robot is moved in response to the operation of the other robot while the relationship is established becomes a useful function. The teaching of the welding part is performed by driving "associative movement control" of two welding robots. However, at the start of the control, it is an issue how "relationship" obtained in welding conditioning work is reproduced and established. How the relationship can be easily established before "associative movement control" is a common issue for not only the welding robots but also all industrial robots employing "associative movement control".

Further, when a work piece to be welded has a plurality of weld lines and a plurality of welded joints must be welded, the welding conditioning work is performed for each welded joint. As a result, a plurality of "relationships" is obtained. In the teaching work, it is required to select one of the plurality of relationships correspondingly to the welded joint for each welding part. In this case, the troublesome work must be performed a plurality of times. Once the relationship is established, "associative movement control" where one robot is moved in response to the operation of the other robot while the relationship is established becomes a useful function. However, at the start of the control, it is an issue how one "relationship" is reproduced and established from the plurality of relationships obtained in welding conditioning work. This issue is also a common issue for not only the welding robots but also all industrial robots employing "associative movement control".

CITATION LIST

Patent Literature

[PTL 1] Unexamined Japanese Patent Publication No. H02-271402
[PTL 2] Unexamined Japanese Patent Publication No. H11-342473

SUMMARY OF THE INVENTION

The present invention provides a control method of a robot system that can reduce the time and effort for the operation for establishing "relationship" before "associative movement control", or select one of a plurality of relationships and reduce the time and effort for the operation for establishing "relationship". Especially, the present invention provides a control method of a robot system including a welding robot.

In a control method of a robot system of the present invention, for addressing the above-mentioned issues, two industrial robots are used, one industrial robot is used as a master robot, and the other is used as a slave robot. The control method includes the following steps:

a storing step of storing, as one set of information, data indicating the relation of the relative position and relative attitude between the master robot and the slave robot; and a first operating step of operating the slave robot with respect to the position of the master robot so as to reproduce the relation of the relative position and relative attitude indicated by the one set of stored information in a state where the master robot and the slave robot exist at any positions; or a second operating step of operating the master robot with respect to the position of the slave robot so as to reproduce the relation of the relative position and relative attitude indicated by the one set of information in a state where the master robot and the slave robot exist at any positions.

In this method, when there are two industrial robots such as welding robots, by storing the relationship between them and reproducing them at any time point, the time and effort for the operation for establishing the relationship between two industrial robots before "associative movement control" can be reduced. Thus, two arcs are generated by two welding electrodes and welding can be performed at a predetermined position where the two arcs do not interfere with each other, so that the bead shape can be optimized. As a result, welding where the coupling strength is sufficient and the reliability is high can be executed.

In a control method of a robot system of the present invention, two industrial robots are used, one industrial robot is used as a master robot, and the other is used as a slave robot. The control method includes the following steps:

a storing step of storing a plurality of sets of information each of which has data indicating the relation of the relative position and relative attitude between the master robot and the slave robot; and a first operating step of operating the slave robot with respect to the position of the master robot so as to reproduce the relation of the relative position and relative attitude indicated by one of the plurality of sets of stored information in a state where the master robot and the slave robot exist at any positions; or a second operating step of operating the master robot with respect to the position of the slave robot so as to reproduce the relation of the relative position and relative attitude indicated by the one of the plurality of sets of stored information in a state where the master robot and the slave robot exist at any positions.

In this method, when there are two industrial robots such as welding robots, by storing a plurality of relationships between them, selecting one of the plurality of relationships, and reproducing them at any time point, the time and effort for the operation for establishing the relationship between two industrial robots before "associative movement control" can be reduced. Thus, two arcs are generated by two torches and welding can be performed at a predetermined position where the two arcs do not interfere with each other, so that the bead shape can be optimized. As a result, welding where the coupling strength is sufficient and the reliability is high can be performed.

DESCRIPTION OF EMBODIMENTS

A welding system in accordance with exemplary embodiments of the present invention will be described hereinafter with reference to the accompanying drawings. Similar elements are denoted with similar reference marks, and the descriptions of those elements are omitted.

First Exemplary Embodiment

Figure 1:
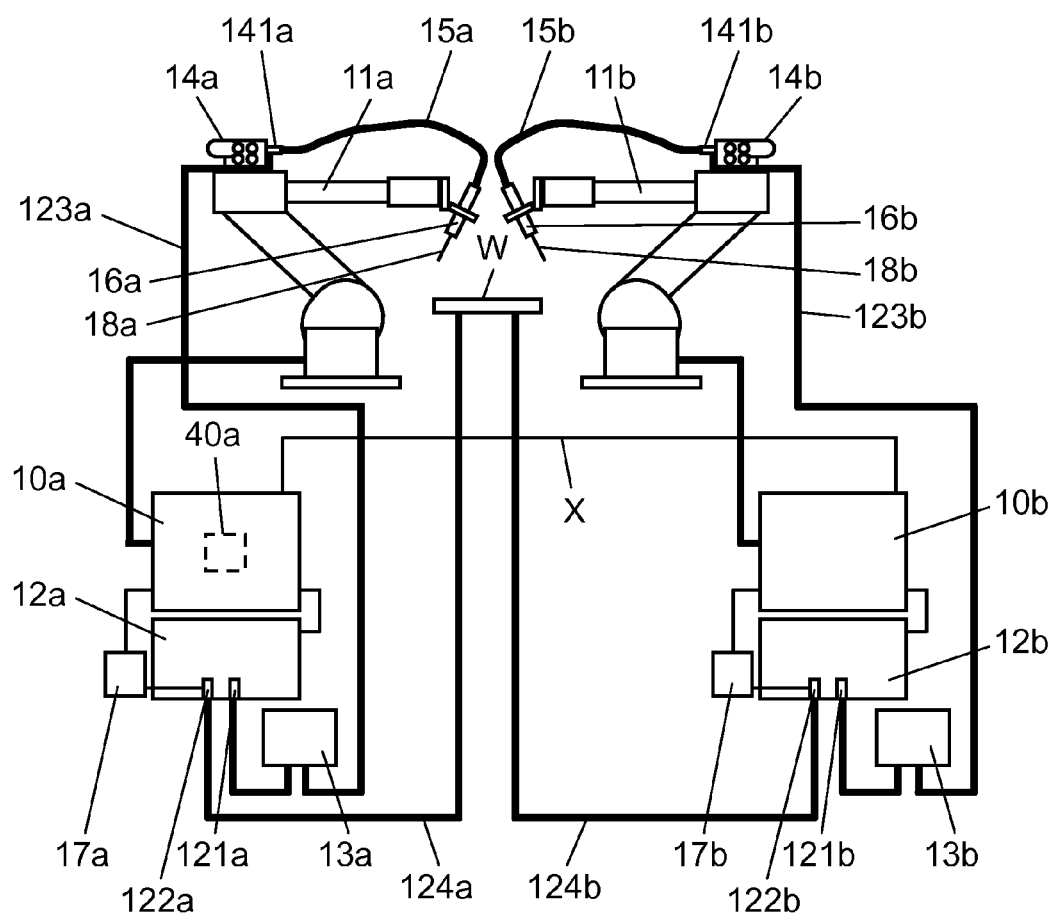
FIG. 1 is a diagram showing a schematic configuration of a welding system in accordance with a first exemplary embodiment of the present invention.

FIG. 1 is a diagram showing a schematic configuration of a welding system in accordance with a first exemplary embodiment of the present invention. FIG. 1 shows an example where the welding system is formed of two welding robots having a peripheral device or the like. The connecting method between component apparatuses depends on the specification of the component apparatuses, and the configuration of FIG. 1 is one example.

In a practical welding system, often, the welding robot includes the following elements: a shift moving device that has a manipulator for holding a tool such as a welding torch and moves the position of the manipulator; a positioner that has a base material to be welded and changes the attitude thereof; and a fixture for mounting the base material. However, this welding system is not directly related to the contents of the present embodiment, so that this welding system is not drawn and described.

In FIG. 1, for purpose of illustration, one of the two welding robots is called as welding robot A, and the number and mark of each element of welding robot A have suffix (a). The other welding robot is called as welding robot B, and the number and mark of each element of welding robot B have suffix (b). Thus, the apparatuses and components constituting the two welding robots are individually drawn and described.

First, the configuration of welding robot A is described. Welding robot A includes manipulator 11a and welding power supply device 12a. Cable 123a is connected to torch terminal 121a disposed in welding power supply device 12a. Base material W is connected through cable 124a to base material terminal 122a disposed in welding power supply device 12a. Wire feeder 14a is attached to manipulator 11a. The operation of manipulator 11a is controlled by controller 10a. When touch sensor unit 13a shown in FIG. 1 is used, cable 123a is connected through it to power feeding terminal 141a disposed in wire feeder 14a. When touch sensor unit 13a is not used, cable 123a is directly connected to power feeding terminal 141a.

Wire feeder 14a is connected to single-electrode welding torch 16a through torch cable 15a. Welding electrode 18a as a consumable welding wire passes through torch cable 15a. Cable 124a whose one end is connected to base material W to be welded is connected to base material terminal 122a whose the other end is disposed in welding power supply device 12a.

In welding, an arc is generated by supplying power between welding electrode 18a and base material W with welding power supply device 12a. By generating the arc, a circuit of welding current connected from torch terminal 121a to base material terminal 122a through welding electrode 18a and base material W is formed. Welding current flows in this circuit of welding current.

By controlling wire feeder 14a with welding power supply device 12a, welding electrode 18a is continuously fed to base material W. By controlling the operation of manipulator 11a with controller 10a, welding electrode 18a moves along the weld line of base material W. Thus, arc welding is performed.

Controller 10a controls the operation of manipulator 11a based on an operation program previously stored in memory 40a shown in FIG. 1, for example. Further, controller 10a issues a command of welding current or welding voltage to welding power supply device 12a. Welding power supply device 12a controls the welding current or welding voltage according to the command.

Arc sensor processing section 17a applies a predetermined processing, in response to a demand of controller 10a, to at least one of the welding current and welding voltage measured in one of the inside of welding power supply device 12a and the circuit of the welding current, converts the processing result into data equivalent to the shift from the weld line of the welding position, and feeds the data to controller 10a. Controller 10a controls the operation of manipulator 11a based on the received data equivalent to the shift from the weld line, and corrects the shift from the weld line of the welding position. Arc sensor processing section 17a is not required necessarily, and is used in the first exemplary embodiment.

Welding robot B welds base material W common with welding robot A, and has the same configuration with that of welding robot A. Therefore, the descriptions of individual apparatuses constituting welding robot B are omitted.

In FIG. 1, controller 10a is connected to controller 10b through an inter-robot communication cable X.

In the first exemplary embodiment, welding robots A and B have single-electrode welding torches 16a and 16b, respectively, and two welding electrodes 18a and 18b are arranged near the weld line so as to be close to each other in the welding progressing direction as in conventional tandem arc welding. In the state where one welding electrode progresses in advance of the other welding electrode in the welding progressing direction on the weld line, they generate arcs with welding electrodes 18a and 18b while moving in the welding progressing direction. In other words, movement of the welding electrode by the other manipulator follows movement of the welding electrode by one manipulator. Then, welding is performed while a molten pool is formed by two nearby arcs generated between two welding electrodes 18a and 18b and base material W. Thus, welding such as the conventional tandem welding can be performed. In other words, in FIG. 1, the welding is performed while one molten pool is formed by two arcs: an arc generated between base material W and welding electrode 18a moved by manipulator 11a; and an arc generated between base material W and welding electrode 18b moved by manipulator 11b. The welding may be performed in two molten pool states by forming two nearby molten pools using two arcs without forming one molten pool using two arcs.

In performing the welding, the processing described in the first exemplary embodiment is performed mainly with the controller of one welding robot. The one welding robot is called a master robot (hereinafter referred to as "master"), and the other welding robot is called a slave robot (hereinafter referred to as "slave"). The processing is performed by the master, so that the program and the parameters such as a welding condition are stored in a memory (not shown) of the controller of the master. Operation required for the processing is also performed through an operation panel (not shown) of the controller of the master.

The master and the slave play different roles, namely the master subjectively performs control and the slave obeys the master. When which welding robot is the master or slave is previously determined before the processing discussed below, any of two welding robots may be set as the master or the slave. Then, essential difference is not required between specifications of the apparatuses constituting two welding robots. In welding control, the master may be leading or following if it is determined.

In the following description, it is assumed that welding robot A is the master, welding robot B is the slave, and the master is leading. In other words, controller 10a is a leading controller of the master, and controller 10b is a following controller of the slave.

Figures 2, 3:
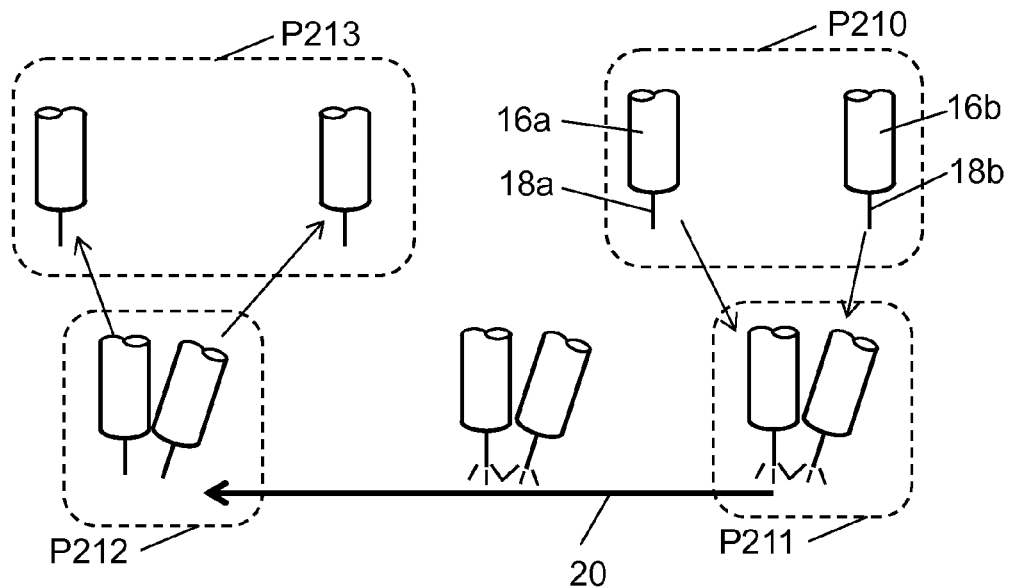
FIG. 2 is a diagram showing an operation of the welding system in accordance with the first exemplary embodiment of the present invention.
FIG. 3 is a diagram showing an example of a program for performing the operation of the welding system in accordance with the first exemplary embodiment of the present invention.

Next, the operation of the welding system shown in FIG. 1 is described using FIG. 2. FIG. 2 is a diagram showing an operation of the welding system in accordance with the first exemplary embodiment of the present invention. The welding for one weld line and the operations of welding electrode 18a and welding electrode 18b before and after the welding are shown in FIG. 2. Here, P210, P211, P212, and P213 surrounded with broken lines show teach points programmed as the operation of the welding robots. Each teach point includes data (hereinafter referred to as "positional data") required for specifying the coordinate and attitude (hereinafter referred to as simply "position") of each of two control points disposed at the tips of welding electrode 18a and welding electrode 18b. Each teach point is a combination of the positions of both welding electrodes 18a and 18b, and is formed of positional data of both welding electrodes 18a and 18b.

Generally, there are various methods of expressing the positional data indicating the position of the industrial robot including a welding robot. For example, there are a method of expressing the data using the position of each operation axis constituting the industrial robot and a method of expressing the data using a matrix determined based on the relationship between respective axes. Either of the methods can be converted into the other method. The method is often used where the tip position of the welding electrode is expressed by the coordinate value in a predetermined rectangular coordinate system, such as coordinate value A0:(X, Y, Z), and the attitude is expressed by the Euler angle defined on the rectangular coordinate of the welding electrode, such as Euler angle B0:(U, V, W). However, the rectangular coordinate is defined according to individual industrial robot. A plurality of rectangular coordinates can be defined. "Positional data" can be expressed uniquely when only one rectangular coordinate system is used, or when there is a plurality of rectangular coordinate systems but only one of them is used. However, when there is a plurality of rectangular coordinate systems and any rectangular coordinate system of them is used, information for specifying which rectangular coordinate system is used is also required. There are many methods of specifying the rectangular coordinate system. These methods do not show new contents and do not especially concern the first exemplary embodiment, so that the descriptions of them are omitted.

In the following description, a rectangular coordinate system (hereinafter referred to as "robot coordinate system") disposed at the center of an attaching section of the manipulator is used, and "positional data" of the welding robot is expressed by a combination of position coordinate value (X, Y, Z) at the tip of the welding electrode and Euler angle (U, V, W) of the attitude of the welding electrode.

When the welding robot has a shift moving device and a positioner and there are a shift axis and a positioner axis, information for specifying these positions is also included in "positional data". However, this is not important in the first exemplary embodiment and is not especially described.

In FIG. 2, for example, an execution start signal is input into controller 10a and controller 10b, and the start of the execution of the program is commanded. Then, manipulator 11a whose operation is controlled by controller 10a and manipulator 11b whose operation is controlled by controller 10b start the operations. After a while, welding electrode 18a and welding electrode 18b reach respective positions shown by P210. These positions are those before welding, and welding electrode 18a is not required to be close to welding electrode 18b. The operations of manipulator 11a and manipulator 11b continue, and welding electrode 18a and welding electrode 18b reach weld line 20 to be close to each other as shown by P211. Then, both welding electrodes start to generate arcs (P211 is welding start point), and the welding is performed in each specified welding condition. Welding electrode 18a and welding electrode 18b move along weld line 20 at a welding speed specified as the welding condition. When welding electrode 18a and welding electrode 18b reach respective positions shown by P212, both welding robots complete the welding (P212 is welding end point). Then, the welding electrodes evacuate from weld line 20, the closing state between welding electrode 18a and welding electrode 18b is canceled as shown in P213, and they move to separate positions in air.

One example of the program for performing such operation is shown as PRG 2 in FIG. 3. FIG. 3 shows one example of the program for performing the operation of the welding system of the first exemplary embodiment of the present invention. This program is stored in one of controller 10a and controller 10b, and stored in a storage section (not shown) in controller 10a of the master, for example.

In FIG. 3, command L201 commands that welding electrode 18a and welding electrode 18b move to respective positions shown by P210. Command L202 commands the welding condition used in welding. Command L203 commands that welding electrode 18a and welding electrode 18b move to respective positions shown by P211. Command L204 commands that welding electrode 18a as the leading electrode starts welding. Command L205 commands that welding electrode 18b as the following electrode starts welding. Command L206 commands that two welding electrodes, namely welding electrode 18a and welding electrode 18b, move to respective positions shown by P212. Command L207 commands that welding electrode 18a as the leading electrode completes the welding. Command L208 commands that welding electrode 18b as the following electrode completes the welding. Command L209 commands that two welding electrodes, namely welding electrode 18a and welding electrode 18b, move to respective positions shown by P213.

Figure 4:
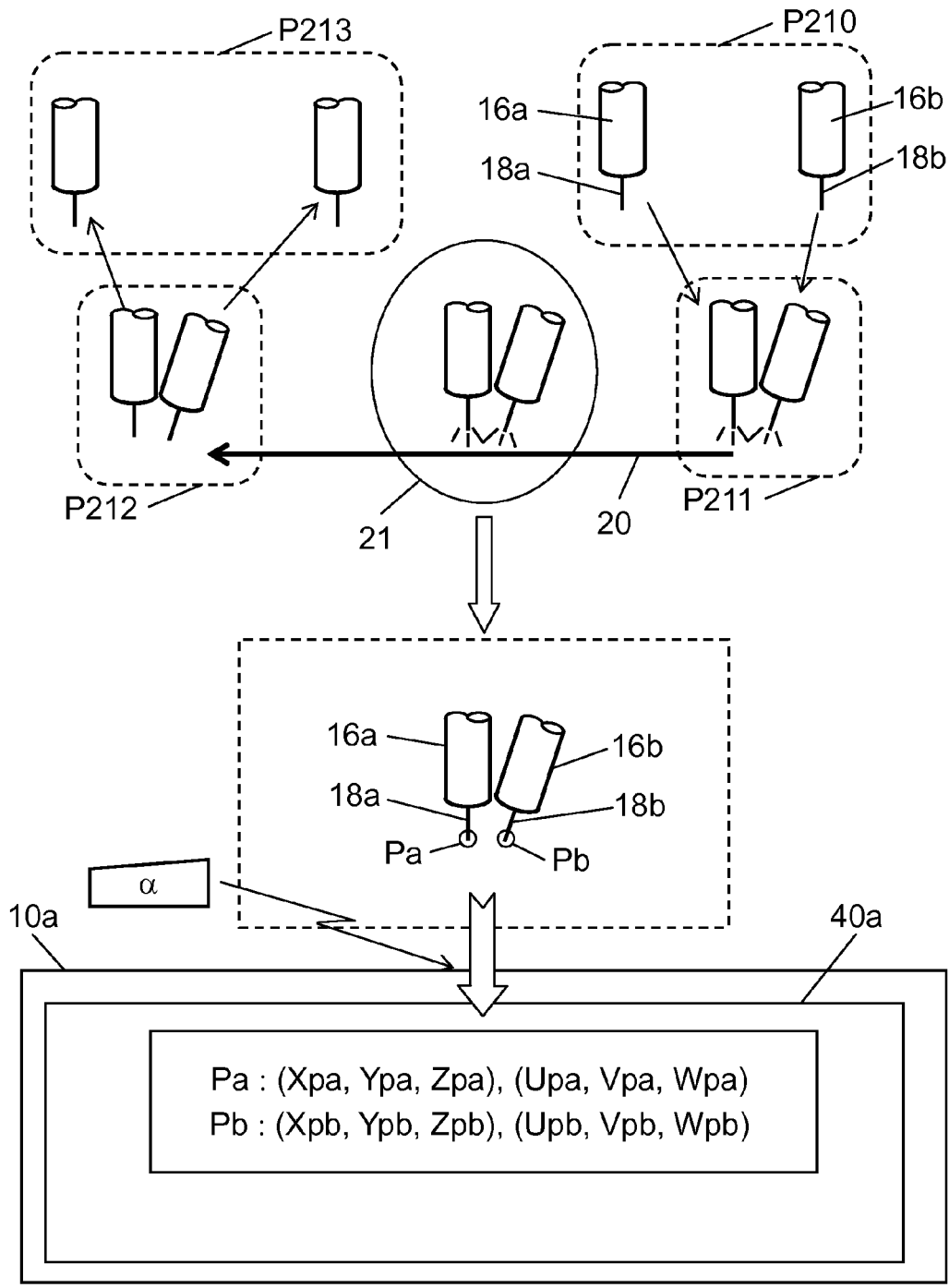
FIG. 4 is a diagram showing storing processing in accordance with the first exemplary embodiment of the present invention.

As one technical characteristic of the first exemplary embodiment, "storing processing" is performed where "positional data" of both welding robots is stored as information showing the relationship between the control point of the tip of welding electrode 18a and that of welding electrode 18b. "Storing processing" of the first exemplary embodiment is described using FIG. 4. FIG. 4 shows the information processing of the first exemplary embodiment.

In "storing processing" shown in FIG. 4, predetermined operation α discussed later is performed in a state where the master and slave have relationship obtained by the welding conditioning work. Thus, the processing executed in one of controller 10a of the master and controller 10b of the slave is "storing processing". The processing may be executed by any of controller 10a and controller 10b, but the processing is assumed to be executed by controller 10a of the master here. Operation α is assumed to be performed with the operation panel (not shown) connected to controller 10a of the master. The operation method and using tool do not directly concern the first exemplary embodiment. This operation is used only for starting "storing processing", and any operation may be employed for this purpose.

FIG. 4 shows an operation example of the welding robot during the welding conditioning work. One of the purpose of the welding conditioning work is to determine "relationship" required for obtaining a desired welding result during the operation from P211 to P212 by adjusting the positional data of both welding robots A and B constituting the teach points of P211 and P212. When appropriate welding is obtained finally, the positional data of both welding robots A and B constituting the teach points of P211 and P212 or the positional data of both welding robots A and B during the operation from P211 to P212 shows the relationship required for obtaining the desired welding result. In other words, the state where the master and slave have the relationship obtained by welding conditioning work in starting "storing processing" shows state 21 surrounded with the solid line shown in FIG. 4 where the operation from P211 to P212 is stopped midway. FIG. 4 shows the example where operation α is performed in this state and "storing processing" is started.

Positional data Pa of the master in the view from "robot coordinate system" of the master when "storing processing" is started and positional data Pb of the slave in the view from "robot coordinate system" of the master are described. Positional data Pa and Pb (coordinate value or Euler angle) is positional data in the coordinate system of the positions of the tips of welding electrode 18a and welding electrode 18b surrounded with small rounds as shown in FIG. 4:

$$Pa:(Xpa,Ypa,Zpa),(Upa,Vpa,Wpa)$$

$$Pa:(Xpb,Ypb,Zpb),(Upb,Vpb,Wpb).$$

Figure 5:
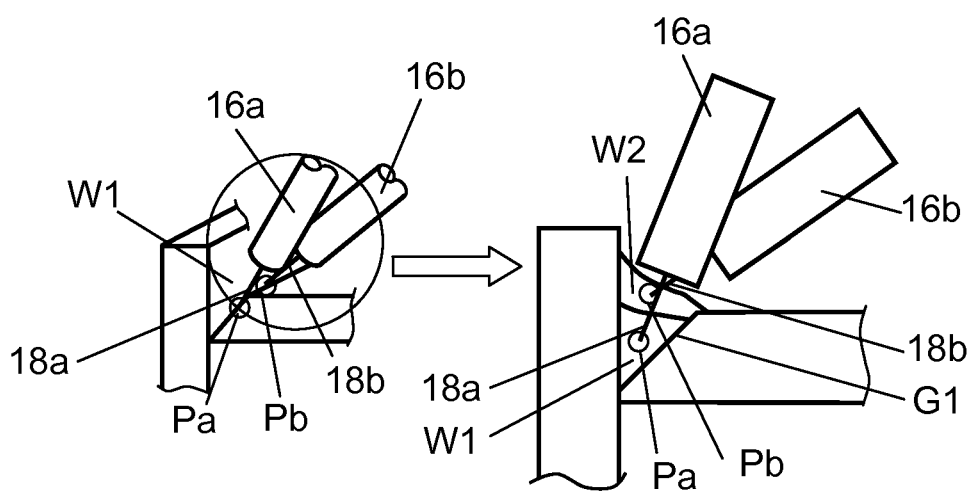
FIG. 5 is a diagram showing the positional relationship between the tips of welding electrodes of two single-electrode welding torches of the welding system in accordance with the first exemplary embodiment of the present invention.

FIG. 5 is a diagram showing the positional relationship between the tips of welding electrodes 18a and 18b of two single-electrode welding torches 16a and 16b of the welding system in accordance with the first exemplary embodiment of the present invention. The part surrounded with the round in the left diagram of FIG. 5 is enlarged to provide the right-side diagram. The position in the coordinate system of positional data Pa and Pb shows coordinate values (Xpa, Ypa, Zpa), (Xpb, Ypb, Zpb), and the angle between the coordinate system and the straight line along the direction from the positions of positional data Pa and Pb to the arranging part of welding electrodes 18a and 18b shows Euler angles (Upa, Vpa, Wpa), (Upb, Vpb, Wpb).

As shown in FIG. 5, single-electrode welding torches 16a and 16b can be made to take different attitudes according to the joint, so that convenience in welding is improved. FIG. 5 shows the case where a fillet welding joint having a chevron-shaped groove is welded. It is assumed that a fillet welding bead having a certain leg length is required to be disposed on the groove part G1. In FIG. 5, leading welding electrode 18a performs first welding W1 of the groove part G1, and following welding electrode 18b performs second welding W2 of a filler part. In this case, when the inclination of following welding electrode 18b to leading welding electrode 18a is made large, a substantially flat bead shape is obtained.

Not two welding systems but one welding system can weld a narrow part that is difficult to be welded by a plurality of electrodes, so that reduction in automation rate as the whole system can be prevented.

The welding system of the first exemplary embodiment is a typical welding system for performing welding with a single-electrode welding torch without using a special apparatus such as a torch for tandem welding or an attaching mechanism for two-torch welding. Thus, the welding system is constituted by typical apparatuses, so that replacement components are obtained easily and inexpensively and the maintenance property is high.

The periphery of the welding torch can be more compact than that in the case where a special apparatus such as the torch for tandem welding or the attaching mechanism for two-torch welding is used. Thus, when the torch for tandem welding or the attaching mechanism for two-torch welding is used, the welding of a part which abuts on a peripheral member or the like of a welding part to prohibit the welding is allowed, and the convenience becomes high.

In "storing processing" of the first exemplary embodiment, information such as coordinate values and Euler angles in the coordinate system of positional data Pa and Pb is stored in memory 40a as the storage section of controller 10a of the master in FIG. 4, for example. The storage medium is not necessarily limited to memory 40a of controller 10a of the master, and may be a memory existing in another part. It is required that the information can be stored and used in the process of "reproducing processing" discussed later. The storage medium may be an external memory of a memory card or the like, and may be a memory disposed in controller 10b of the slave.

Figure 6:
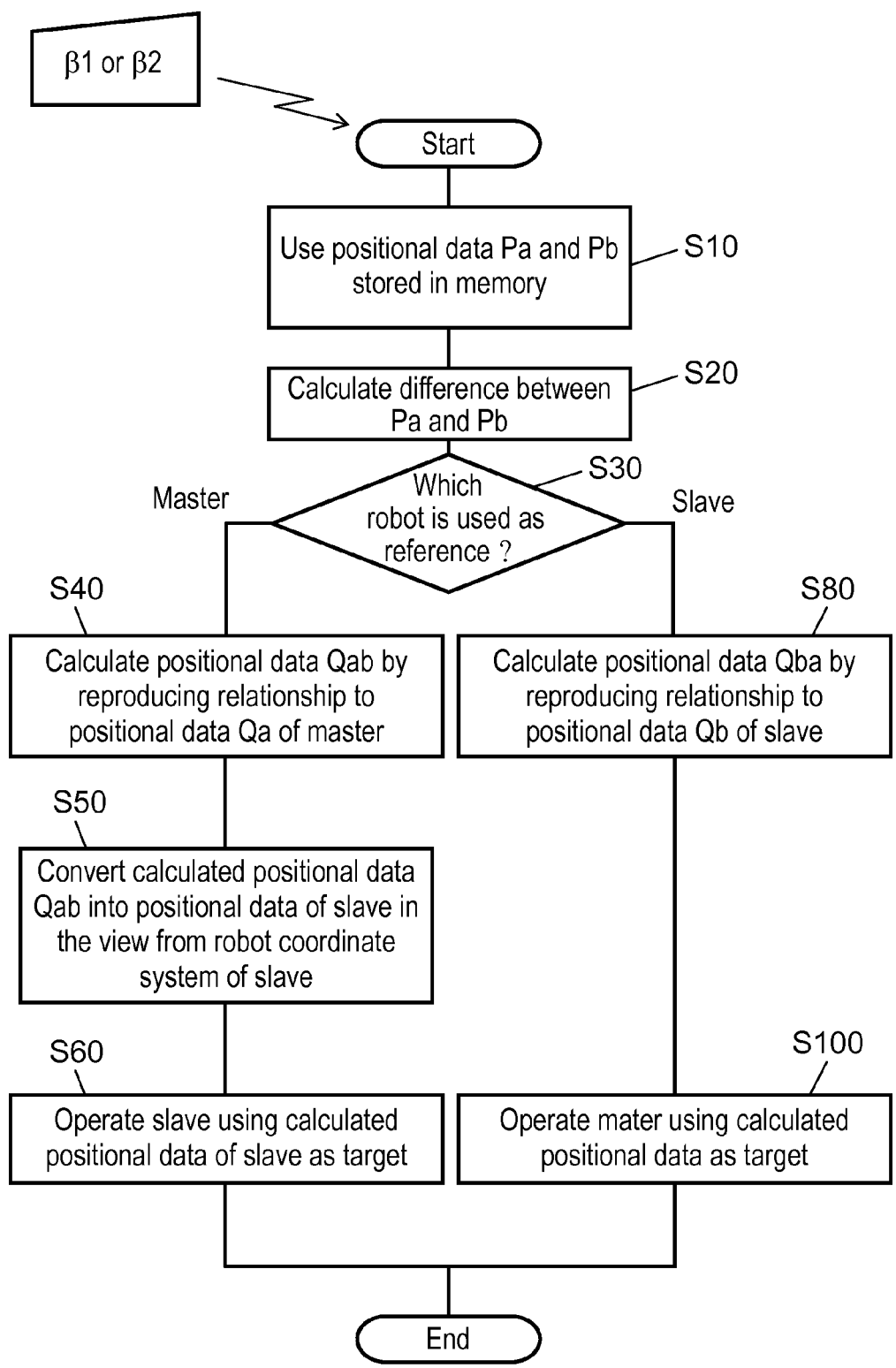
FIG. 6 is a diagram showing reproducing processing in accordance with the first exemplary embodiment of the present invention.

As another technical characteristic of the first exemplary embodiment, the relationship is reproduced by operating one of the master and slave robots for the other robot. The process of "reproducing processing" of the first exemplary embodiment is described using FIG. 6. FIG. 6 is a diagram showing the reproducing processing in accordance with the first exemplary embodiment of the present invention.

"Reproducing processing" is executed in a state where the master and slave exist at any positions. This processing is started by predetermined operation β1 or predetermined operation β2 in a state where the master or slave exists in a place requiring reproduction of relationship or near that place, for example. Operation β1 or operation β2 is assumed to be executed through an operation panel (not shown) connected to controller 10*a* of the master. As the apparatus of the operation panel, a teaching pendant or the like for teaching or the like of a robot is used, for example. However, the operation method and using tool do not directly concern the first exemplary embodiment. This operation is used only for starting "reproducing processing", and any operation may be employed for this purpose. Operation β1 differs from operation β2 in which robot is used as the reference when the relationship is reproduced. For example, in operation β1, the relationship is reproduced with reference to the master. In operation β2, the relationship is reproduced with reference to the slave.

At the time when "reproducing processing" is started, positional data Qa of the master in the view from "robot coordinate system" of the master and positional data Qb of the slave in the view from "robot coordinate system" of the master are expressed by $$Qa:(Xqa,Yqa,Zqa),(Uqa,Vqa,Wqa)$$

$$Qa:(Xqb,Yqb,Zqb),(Uqb,Vqb,Wqb).$$

As shown in FIG. 6, "reproducing processing" is started by performing operation β1 or β2. In step S10, firstly, Pa and Pb of the information stored in "reproducing processing" are read from memory 40*a* of controller 10*a* of the master.

In step S20 of FIG. 6, the difference between positional data Pa and positional data Pb, namely relative position difference Δxyz and relative attitude difference Δuvw, are calculated. Relative position difference Δxyz and relative attitude difference Δuvw are expressed by $$\Delta xyz=(Xpb,Ypb,Zpb)-(Xpa,Ypa,Zpa)$$

$$\Delta uvw=(Upb,Vpb,Wpb)-(Upa,Vpa,Wpa).$$

Next, the process branches in step S30 according to which robot is used as the reference when the relationship is reproduced. When "reproducing processing" is started by operation β1, it is determined that the master is used as the reference in step S30, the process goes to step S40. In step S40, the slave position where the relationship to the master position is reproduced is calculated. In other words, positional data Qab having relative position difference Δxyz and relative attitude difference Δuvw to positional data Qa of the master is calculated as follows:

$$Qab:(Xqa,Yqa,Zqa)+(Xpb,Ypb,Zpb)+(Xpa,Ypa,Zpa),\\(Uqa,Vqa,Wqa)+(Upb,Vpb,Wpb)-(Upa,Vpa,Wpa).$$

In step S50, positional data Qab determined in step S40 is converted into the positional data of the slave in the view from "robot coordinate system" of the slave. At this time, converting processing using a conversion matrix expressing the positional relationship between the master and the slave is performed, but this converting processing is a known technology and is not especially described here.

In step S60, the slave is operated based on the positional data of the slave determined in step S50. At this time, via inter-robot communication cable X, processing such as a transfer of the positional data from the master to the slave and an operation command from the master to the slave is performed.

Figure 7:
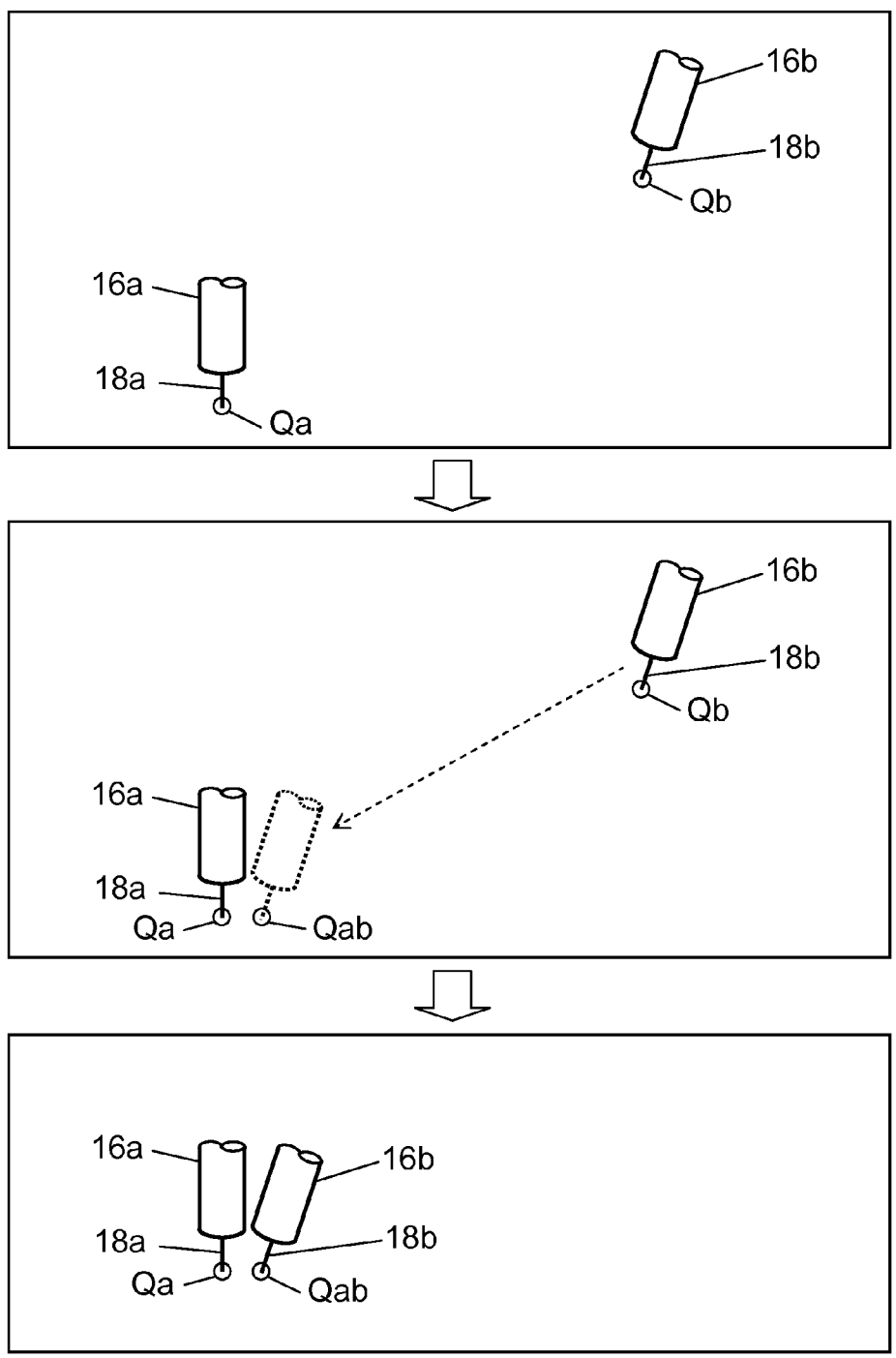
FIG. 7 is a diagram showing an example of the reproducing processing based on a master in accordance with the first exemplary embodiment of the present invention.

Thus, when the master and the slave exist at any positions, the slave can be operated to the position of the slave where the relationship is reproduced to the position of the master. This operation is shown in FIG. 7. FIG. 7 is a diagram showing an example of the reproducing processing based on the master in accordance with the first exemplary embodiment of the present invention. In FIG. 7, single-electrode welding torch 16*a* is the torch on the master side, and single-electrode welding torch 16*b* is the torch on the slave side.

While, when "reproducing processing" is started by operation β2, it is determined that the slave is used as the reference in step S30, the process goes to step S80. In step S80, the master position where the relationship is reproduced to the slave position is calculated. In other words, positional data Qba having relative position difference Δxyz and relative attitude difference Δuvw to positional data Qb of the slave in the view from "robot coordinate system" of the master is calculated as follows:

$$Qba:(Xqb,Yqb,Zqb)-(Xpb,Ypb,Zpb)+(Xpa,Ypa,Zpa),\\(Uqb,Vqb,Wqb)-(Upb,Vpb,Wpb)+(Upa,Vpa,Wpa).$$

Positional data Qba determined in step S80 is the positional data in the view from "robot coordinate system" of the master. In step S100, the master is operated to the positional data.

Figure 8:
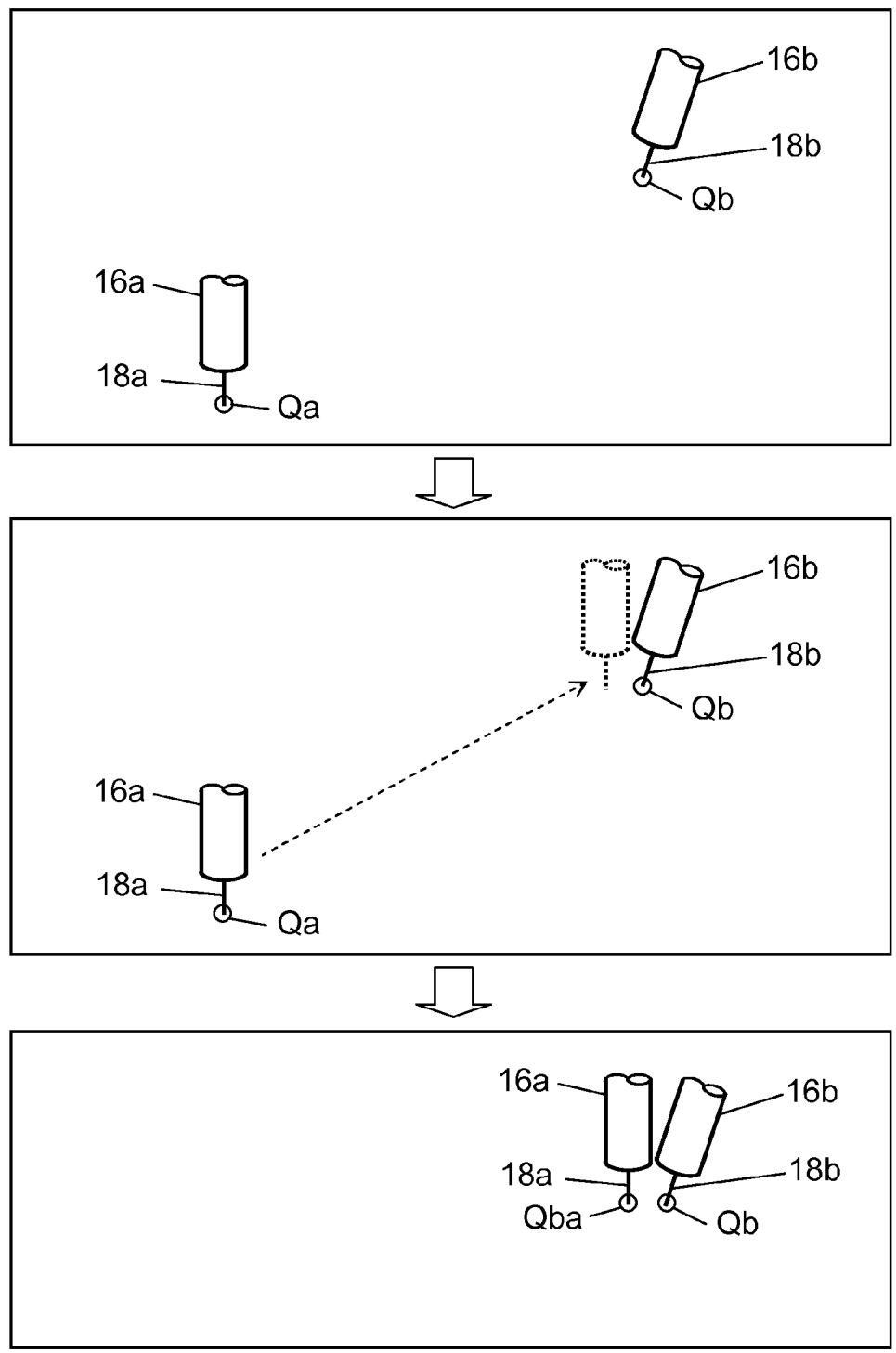
FIG. 8 is a diagram showing an example of the reproducing processing based on a slave in accordance with the first exemplary embodiment of the present invention.

Thus, when the master and the slave exist at any positions, the master can be operated to the position of the master where the relationship to the position of the slave is reproduced. This operation is shown in FIG. 8. FIG. 8 is a diagram showing an example of the reproducing processing based on a slave in accordance with the first exemplary embodiment of the present invention. In FIG. 8, single-electrode welding torch 16*a* is the torch on the master side, and single-electrode welding torch 16*b* is the torch on the slave side.

In the first exemplary embodiment, when the relationship allowing a desired welding is obtained by "welding conditioning work", information showing the relationship at that time is stored. Then, during "teaching work", the stored relationship is reproduced. Thus, the relative position and relative attitude can be easily established during "teaching work".

When two welding robots having one welding electrode are used and welding is performed while two welding electrodes are arranged close to each other near the weld line in the welding progressing direction as in the conventional tandem welding, the relationship which is the relative position and relative attitude is important. Therefore, in performing such welding, the first exemplary embodiment is especially effective.

In other words, in a control method of the robot system of the present invention, two industrial robots are used, one industrial robot is used as a master robot, and the other is used as a slave robot. The control method includes a storing step, and a first operating step or second operating step. In the storing step, data indicating the relation of the relative position and relative attitude between the master robot and the slave robot is stored as one set of information. In the first operating step, in a state where the master robot and the slave robot exist at any positions, the slave robot is operated with respect to the position of the master robot so as to reproduce the relation of the relative position and relative attitude indicated by one set of stored information. In the second operating step, in a state where the master robot and the slave robot exist at any positions, the master robot is operated with respect to the position of the slave robot so as to reproduce the relation of the relative position and relative attitude indicated by the one set of information.

In this method, when there are two industrial robots such as welding robots, by storing the relationship between them and reproducing them at any time point, the time and effort for the operation for establishing the relationship between two industrial robots before "associative movement control" can be reduced. Thus, two arcs are generated by two torches and welding can be performed at a predetermined position where the two arcs do not interfere with each other, so that the bead shape can be optimized. As a result, welding where the coupling strength is sufficient and the reliability is high can be performed.

The following method may be used. The master robot is a welding robot for holding one welding electrode, and the slave robot is also a welding robot for holding one welding electrode. One set of information to be stored indicates the relation of the relative position and relative attitude between the welding electrode held by the master robot and the welding electrode held by the slave robot.

In this method, the time and effort for the operation for establishing the relationship between two industrial robots before "associative movement control" can be further reduced.

One set of information to be stored indicates the relation of the relative position and relative attitude between the welding electrode held by the mater robot and that held by the slave robot when an appropriate welding condition is determined. Here, the appropriate welding condition is determined by performing the welding conditioning work of determining the appropriate welding condition by performing welding many times while changing the contents of the items of the welding condition. A method may be employed where the relation of the relative position and relative attitude indicated by the one set of stored information is reproduced when the teaching work of the welding robot is performed.

This method can further reduce the time and effort for the operation for establishing the relationship between two industrial robots before "associative movement control".

Second Exemplary Embodiment

Figure 9:
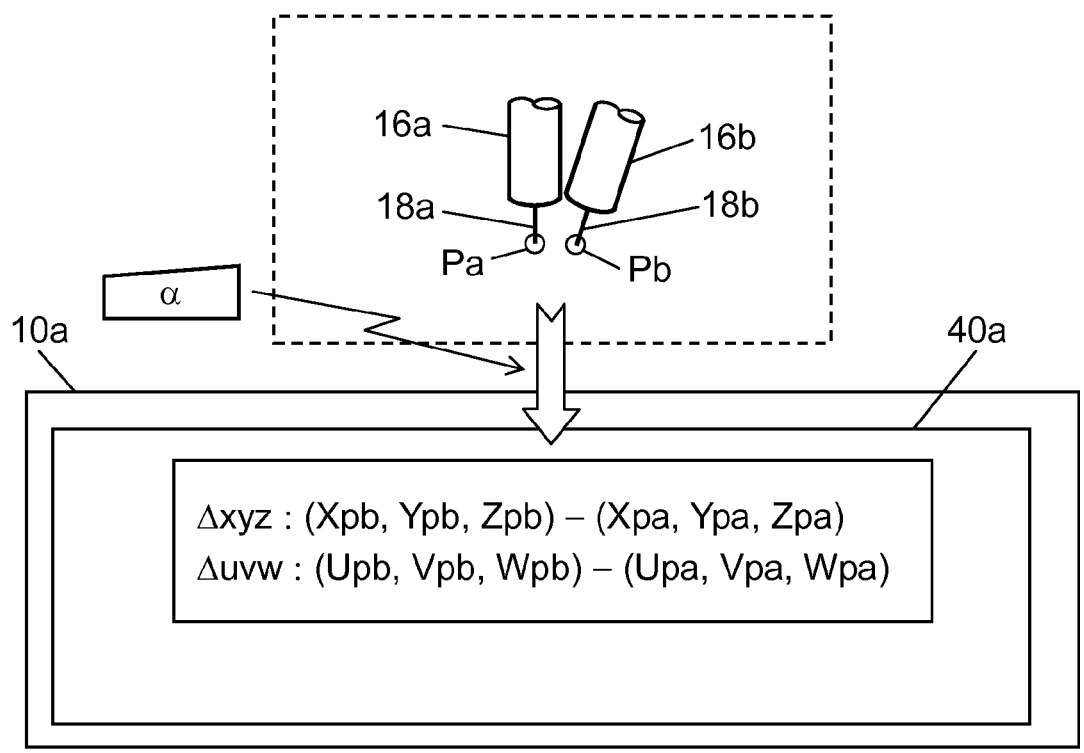
FIG. 9 is a diagram showing storing processing in accordance with a second exemplary embodiment of the present invention.
Figure 10:
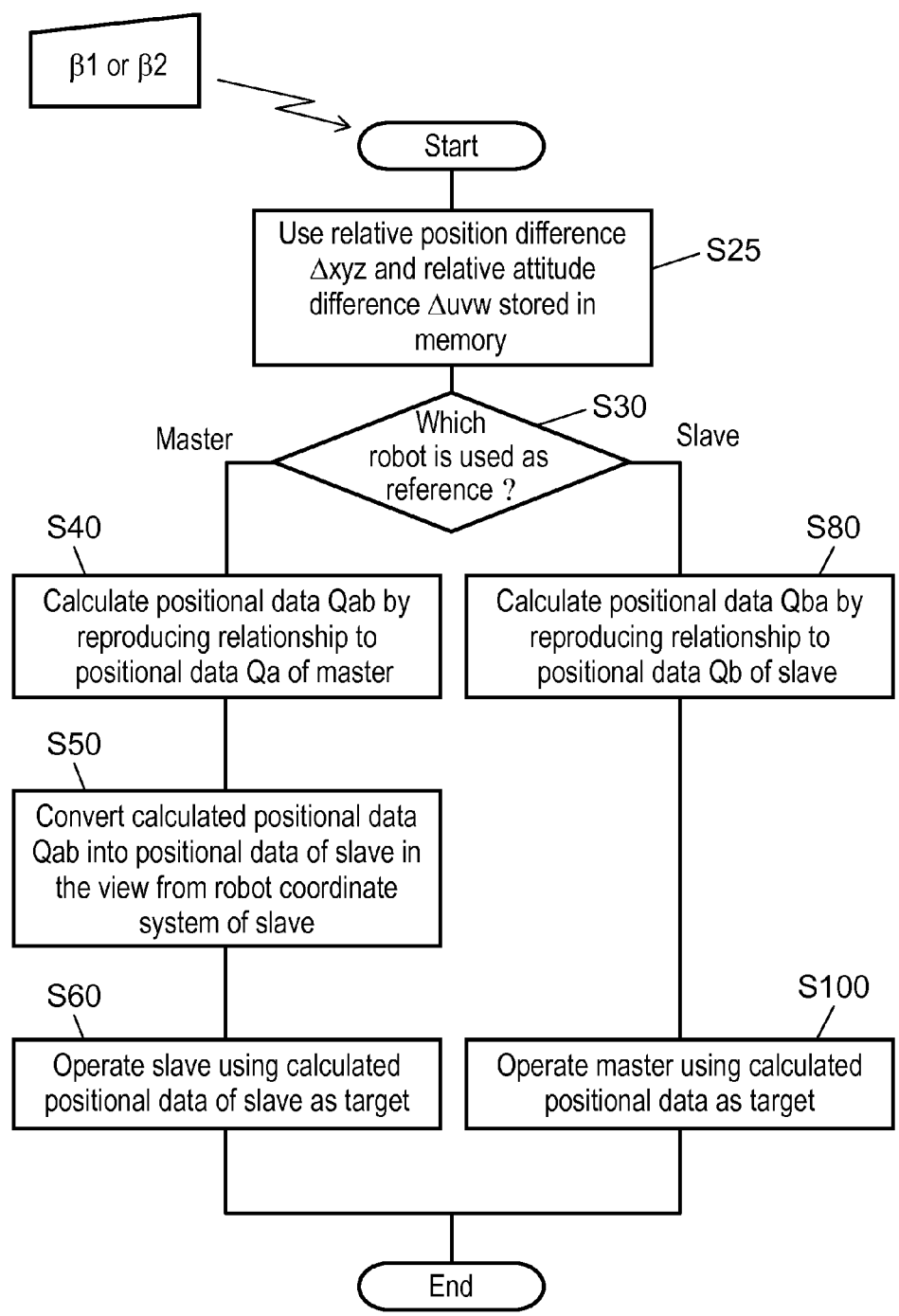
FIG. 10 is a diagram showing reproducing processing in accordance with the second exemplary embodiment of the present invention.

FIG. 9 is a diagram showing storing processing in accordance with a second exemplary embodiment of the present invention. FIG. 10 is a diagram showing reproducing processing in accordance with the second exemplary embodiment of the present invention. A control method of a robot system of the present invention is specifically described using FIG. 9 and FIG. 10. The second exemplary embodiment differs from the first exemplary embodiment in the form of the information stored by "storing processing".

The information stored by "storing processing" in the first exemplary embodiment is used for reproducing the relationship by "reproducing processing". This information is simply required to reproduce the relationship, so that the information is not required to be positional data such as Pa and Pb as shown in the first exemplary embodiment, but may be the calculation result of relative position difference $\Delta xyz$ and relative attitude difference $\Delta uvw$ as shown in FIG. 8 and expressed by $\Delta xyz=(Xpb, Ypb, Zpb)-(Xpa, Ypa, Zpa)$ $\Delta uvw=(Upb, Vpb, Wpb)-(Upa, Vpa, Wpa)$.

In the first exemplary embodiment, relative position difference $\Delta xyz$ and relative attitude difference $\Delta uvw$ are calculated by "reproducing processing". In the second exemplary embodiment, however, they are calculated and stored in "storing processing". Therefore, the process of "reproducing processing" starts in step S25 in FIG. 10. In step S25, the calculation result of relative position difference $\Delta xyz$ and relative attitude difference $\Delta uvw$ stored in the memory by "storing processing" is used. The process from step S30 to step S100 of FIG. 10 is similar to the process from step S30 to step S100 of FIG. 6 in the first exemplary embodiment, so that the detailed description of the process is omitted.

In the second exemplary embodiment, when the relationship allowing a desired welding is thus obtained by "welding conditioning work", the information showing the relationship is stored. Then, the information is reproduced during "teaching work", and hence the relative position and relative attitude can be easily established during "teaching work". Thus, two arcs are generated by two torches and welding can be performed at a predetermined position where the two arcs do not interfere with each other, so that the bead shape can be optimized. As a result, welding where the coupling strength is sufficient and the reliability is high can be performed.

Third Exemplary Embodiment

Figure 11:
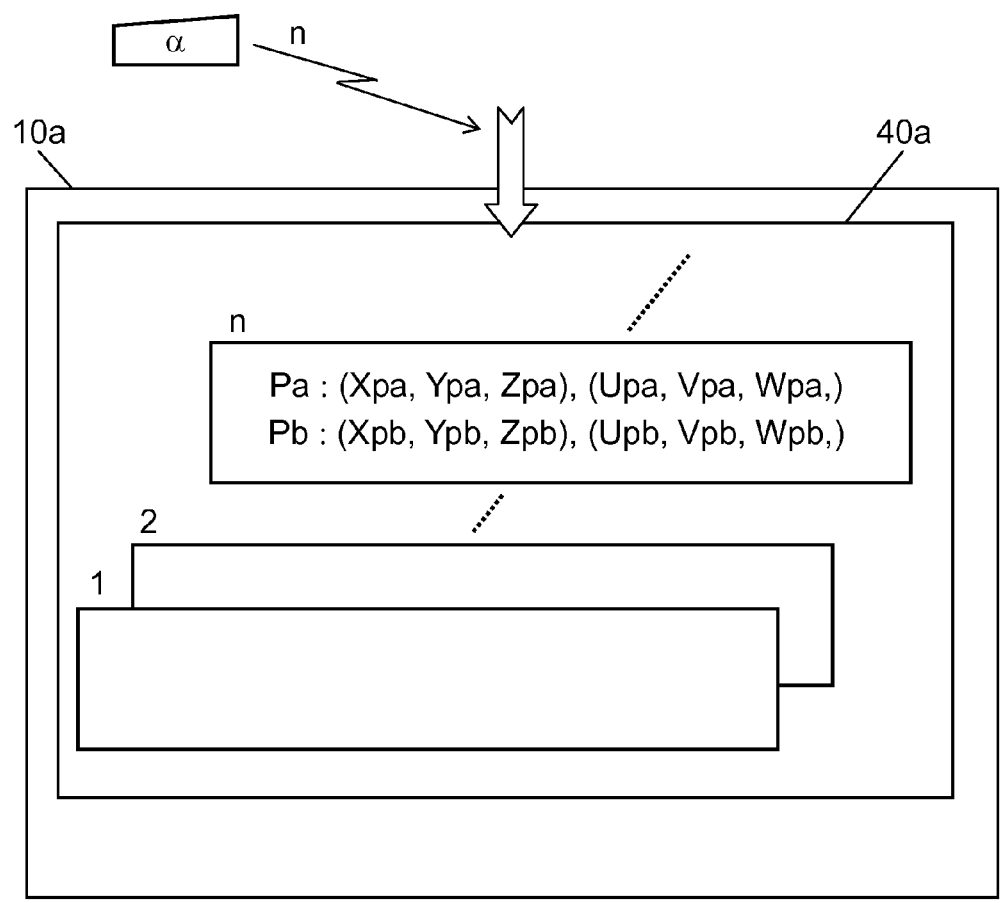
FIG. 11 is a diagram showing storing processing of a plurality of sets of information in accordance with a third exemplary embodiment of the present invention.
Figure 12:
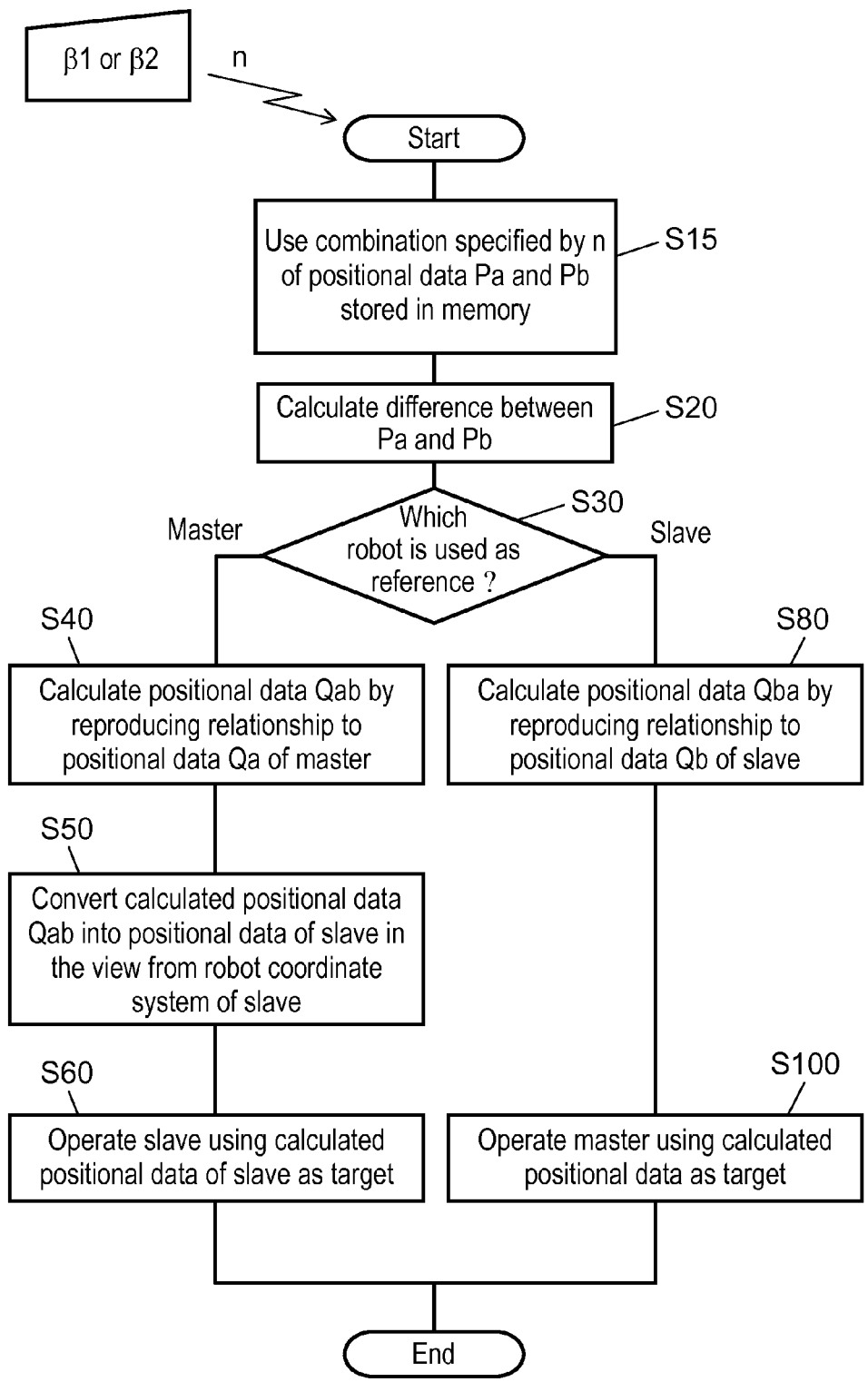
FIG. 12 is a diagram showing reproducing processing of a plurality of sets of information in accordance with the third exemplary embodiment of the present invention.

FIG. 11 is a diagram showing storing processing of a plurality of sets of information in accordance with a third exemplary embodiment of the present invention. FIG. 12 is a diagram showing the reproducing processing of a plurality of sets of information in accordance with the third exemplary embodiment of the present invention. A control method of a robot system of the present invention is specifically described using FIG. 11 and FIG. 12. The third exemplary embodiment differs from the first and second exemplary embodiments in that a plurality of sets of information showing the relationship between both robots is stored by "storing processing" and one set of information is selected from the plurality of sets of stored information and reproduced by "reproducing processing".

In the first exemplary embodiment and second exemplary embodiment, one set of information indicating the relationship between both robots is stored, and the reproduction is performed using it. Here, the information is a combination of positional data Pa and positional data Pb, or a combination of relative position difference $\Delta xyz$ and relative attitude difference $\Delta uvw$. In the third exemplary embodiment, the information showing a plurality of relationships is stored and the relationship is reproduced using one set of information selected from the plurality of sets of stored information.

In the following description, the positional data itself shown in the first exemplary embodiment is stored. However, the relative position difference and relative attitude difference shown in the second exemplary embodiment may be stored.

FIG. 11 shows "storing processing" of the third exemplary embodiment. Operation $\alpha$ for starting "storing processing" is performed together with setting of identification code n (for example, identification number) for identifying the information to be stored, and a plurality of sets of information is managed so as to be specified with identification code n and stored in memory 40a of controller 10a of the master robot. Identification code n is number "1, 2, . . . " for example, and is stored in memory 40a in association with the information to be stored. FIG. 11 shows this operation, and shows the example where n sets of information are stored (identification code n is 1 through n).

In "reproducing processing" of FIG. 12, operation $\beta 1$ or operation $\beta 2$ for starting "reproducing processing" is performed together with setting of identification code n for identifying the information to be used. Identification code n is described later. In step S15 of FIG. 12, one set of positional data is selected from the plurality of sets of information in memory 40a in response to identification code n and is used. The process from step S20 to step S100 of FIG. 12 is similar to the process from step S20 to step S100 of FIG. 6 in the first exemplary embodiment, so that the description of this process is omitted.

In the third exemplary embodiment, information indicating a plurality of relationships is stored, and one can be selected from them and reproduced during "teaching work".

For example, when welding conditioning work is applied to a plurality of different welding joints and relationships allowing a desired welding for each welding joint are obtained, these relationships are stored in memory 40*a* in association with code n associated with each welding joint. When operation β1 or operation β2 for starting "reproducing processing" is performed during "teaching work" for a certain welding joint, the relationship appropriate to the welding joint can be reduced by inputting identification code n associated with the welding joint.

In other words, in a control method of the robot system of the present invention, two industrial robots are used, one industrial robot is used as a master robot, and the other is used as a slave robot. The control method includes a storing step, and a first operating step or second operating step. In the storing step, a plurality of sets of information each of which includes data indicating the relation of the relative position and relative attitude between the master robot and the slave robot is stored. In the first operating step, in a state where the master robot and the slave robot exist at any positions, the slave robot is operated with respect to the position of the master robot so as to reproduce the relation of the relative position and relative attitude indicated by one of the plurality of sets of stored information. In the second operating step, in a state where the master robot and the slave robot exist at any positions, the master robot is operated with respect to the slave robot so as to reproduce the relation of the relative position and relative attitude indicated by one of the plurality of sets of stored information.

In this method, when there are two industrial robots such as welding robots, the plurality of relationships is previously stored, one relationship is selected from the plurality of relationships, and the selected relationship is reproduced at any time point. Thus, the time and effort for the operation for establishing the relationship between two industrial robots before "associative movement control" can be reduced. Thus, two arcs are generated by two torches and welding can be performed at a predetermined position where the two arcs do not interfere with each other, so that the bead shape can be optimized. As a result, welding where the coupling strength is sufficient and the reliability is high can be performed.

The following method may be used. The master robot is a welding robot for holding one welding electrode, and the slave robot is also a welding robot for holding one welding electrode. One set of information to be stored is information indicating the relation of the relative position and relative attitude between the welding electrode held by the master robot and the welding electrode held by the slave robot.

In this method, the time and effort for the operation for establishing the relationship between two industrial robots before "associative movement control" can be further reduced.

One set of information to be stored indicates the relation of the relative position and relative attitude between the welding electrode held by the mater robot and that held by the slave robot when an appropriate welding condition is determined. Here, the appropriate welding condition is determined by performing the welding conditioning work of determining the appropriate welding condition by performing welding many times while changing the contents of the items of the welding condition. Then, when the teaching work of the welding robot is performed, the relation of the relative position and relative attitude indicated by one set of stored information is reproduced. The method may be employed where information indicating the relation of the relative position and relative attitude for each of the welding joints required for the weld lines is stored, and information indicating the relation of the relative position and relative attitude for each of the welding joints required for the weld lines is reproduced.

This method allows each reproduction of the relative position and relative attitude for each welding joint.

INDUSTRIAL APPLICABILITY

A control method of an industrial system of the present invention can reduce the time and effort for the operation where the relationship obtained by "welding conditioning work" when tandem welding is performed using two welding robots discussed above is reproduced during teaching work of a program for a welding part of an actual work piece. Further, in the work using two industrial robots, for example when a welding robot welds a work piece gripped by a handling robot or when one work piece is conveyed with two handling robots, the operation load can be reduced in the case where the relationship between two industrial robots is important for the work. This control method is industrially useful.

REFERENCE MARKS IN THE DRAWINGS

10*a*, 10*b* controller
11*a*, 11*b* manipulator
12*a*, 12*b* welding power supply device
13*a*,13*b* touch sensor unit
14*a*, 14*b* wire feeder
15*a*, 15*b* torch cable
16*a*, 16*b* single-electrode welding torch
17*a*, 17*b* arc sensor processing section
18*a*, 18*b* welding electrode
20 weld line
21 state
40*a* memory
121*a*, 121*b* torch terminal
122*a*, 122*b* base material terminal
123*a*, 123*b*, 124*a*, 124*b* cable
141*a*, 141*b* power feeding terminal

The invention claimed is:

1. A method of controlling a robot system, wherein said robot system includes a first robot which is coupled to a first electrode and a second robot which is coupled to a second electrode, the method comprising the steps of:

welding with the first electrode and simultaneously welding with the second electrode one test piece multiple times, wherein during each of the times as the first electrode and the second electrode simultaneously generate respective arcs and weld, the first robot and the second robot move and have respectively different physical positions relative to each other and therefore the first electrode and the second electrode have respectively different physical positions relative to each other in order to create a plurality of respectively different physical positions of the first robot and the second robot relative to each other for each of the multiple times;

selecting one of the plurality of respectively different physical positions relative to each other as a welding position;

using a microprocessor, placing the first robot with the first electrode into the welding position to begin welding a welding piece;

placing the second robot with the second electrode into the welding position to begin welding the welding piece, wherein the second robot is placed into the welding position based on relative position of the first robot;

moving the first robot with the first electrode and the second robot with the second electrode along a route to weld the welding piece, wherein as the second robot moves the second electrode, the second robot is maintained in the welding position based on relative position of the first robot, and the second electrode is maintained in the welding position based on relative position of the first electrode; and welding the welding piece using the first robot with the first electrode and the second robot with the second electrode during the moving.

2. The method of controlling the robot system of claim 1, wherein the first robot holds the first electrode, and the second robot holds the second electrode, and the welding position is a relation of relative position and relative attitude between the first electrode and the second electrode.

3. The method of controlling the robot system of claim 2, wherein welding is performed by an arc generated between the welding piece and the first electrode and by an arc generated between the welding piece and the second electrode.

4. The method of controlling the robot system of claim 2, wherein movement of the first electrode is followed by movement of the second electrode, and the first electrode and the second electrode simultaneously perform welding along the route.

5. The method of controlling the robot system of claim 1, wherein the first robot is a master robot and the second robot is a slave robot.

\* \* \* \* \*